May 10, 1949.  R. D. LOWRY ET AL  2,469,972
MACHINE FOR WELDING THERMOPLASTIC FILMS
Filed Feb. 23, 1945

INVENTORS
Robert D. Lowry
William R. Church
BY
Griswold & Burdick
ATTORNEYS

Patented May 10, 1949

2,469,972

UNITED STATES PATENT OFFICE 2,469,972

MACHINE FOR WELDING THERMOPLASTIC FILMS

Robert D. Lowry and William Roland Church, Midland, Mich., assignors to The Dow Chemical Company, Midland, Mich., a corporation of Delaware Application February 23, 1945, Serial No. 579,440

6 Claims. (Cl. 154—42)

1

This invention relates to a method of, and an apparatus for, uniting or welding thermoplastic films and similar heat-sealable materials. It relates, more particularly, to such a method and apparatus which will effectively unite oriented films of thermoplastics of the type which exhibit a tendency to shrink when heated.

It is well recognized that many thermoplastic films are produced by a method which involves a stretching and consequent orientation of the plastic material and that when such oriented articles are heated, they tend to return to the smaller size which the same amount of plastic would have had prior to stretching. This is especially true when such films are heated to temperatures above the fusion point of the plastic from which they are made. This property has variously been referred to as "plastic memory," "thermal recovery," and "an unbalanced condition." The existence of this property in many thermoplastic films is particularly embarrassing when attempts are made to seal or unite two or more layers of such film by a welding operation. It has been recognized previously that the difficulties attendant upon such a welding operation may be overcome, in part, by confining the layers to be welded between supporting means throughout the heating operation involved in welding, as well as during the subsequent cooling operation. It has also been proposed to confine the heating to a narrow zone while actually chilling laterally adjacent portions of the film.

Recent technical developments have made it desirable to employ large quantities of oriented thermoplastic films as protective wrappers for such miscellaneous items as food products, machine guns, aircraft engines, and numerous other materials, especially where protection against humidity and salt spray is required. The attendant increase in the use of oriented films has demonstrated clearly the necessity for an improved method of sealing. Owing to the irregular nature of many of the articles which have been shipped in film envelopes, it has been found that unusual stresses, many of which are localized, may be placed upon the weld line of the container. It has been found that when the previously proposed methods are employed, wherein a uniform heating and complete fusion of the plastic material is attempted across the entire width of the weld, there is actually obtained a weak and non-uniform seal, the short-comings of which can be demonstrated by a simple test. If two superposed plastic films are welded and an attempt is made to pull them apart at the weld, it is found that a wavy or shoreline effect along the edge of the seal pre-

2 vents distribution of the applied stress along a straight line. This indicates a non-uniform and hence an imperfect and undesirable weld, which is apt to fail. Such an effect is almost invariably obtained when oriented films are sealed in accordance with the previously known methods. If, however, application of tension to a welded film joint results in a partial peeling back of the outer edges of the weld, it is found that the load is ultimately distributed along a straight line, preventing localized concentration of the stresses, and that such a weld will prove satisfactory in service.

It is accordingly an object of the invention to provide a method of sealing or welding thermoplastic films to provide a joint which will yield along its lateral edges sufficiently to distribute the applied load along a straight line. A related object is to provide such a method wherein the film laterally adjacent to the weld line is not subject to more than instantaneous exposure to temperatures which might induce thermal recovery. A related object is the provision of an apparatus wherein the foregoing objects may be attained. A still further object is the provision of a method for the continuous production of welds in thermoplastic sheet material which welds will exhibit the above described desired property of being able to distribute applied tension along a straight line. Other and related objects may become apparent from the following description, the appended claims, and the annexed drawings, wherein:

Figs. 3, 3a, 3b, 3c, and 3d are views of various possible faces of a heating element for use in the apparatus of the invention.

The method of the present invention comprises superposing two or more layers of organic thermoplastic film, confining a portion of the superposed layers between flexible metal tapes to resist lateral movement, while conveying them longitudinally past a source of heat distributed across the tapes in such a manner that at least one edge of the weld is heated very briefly to a temperature at or near the fusion point while the rest of the weld zone is heated for a relatively prolonged (though actually quite short) period at a temperature to effect fusion of the plastic material confined between the tapes, thence past a cooling station to reduce the temperature of the tapes and confined film rapidly at least to a temperature at which the films are non-tacky, usually below 70° C., and finally releasing the so-welded films from between the confining tapes. When films are welded in the manner just outlined, it is found that the application of tension to the weld permits the partial peeling back of the briefly heated lateral edge of the weld until the tension is distributed along a straight line and is absorbed by the thoroughly fused body of the weld. The joints produced in this manner, and having the described desirable property, have given satisfactory service under the extreme conditions encountered in the packing and shipment of ordnance items. The simplicity of the method makes it adaptable for use in packaging much simpler items of regular shape, including, for example, the production line packaging of foodstuffs.

Further details of the method may be understood more clearly from a description of the apparatus whereby the present method may be carried out.

Figure 3:
Figure 3C:
Figure 3A:
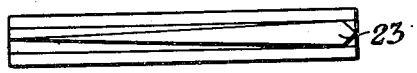
Figure 3D:
Figure 3B:
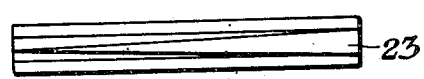

The apparatus comprises endless flexible metal belts or tapes 10 which pass around driven wheels 11 and idler wheels 12, tension being maintained by any suitable means, such as springs 13 acting on lever arms 14 attached to housings 15 eccentrically positioned about shafts 16. A series of idler rolls 17 is aligned on either side of and with all but the end members 27 of the series tangent to a straight line path between wheels 11 and 12, and tapes 10 pass in face-to-face relationship between the two rows of rolls 17. Owing to the thickness of tapes 10, they are forced to follow a sinuous, rather than a straight path in passing rolls 17. A pair of heating shoes 18 is positioned on either side of the pair of belts 10, as is a pair of cooling shoes 19. The heating and cooling stations break the continuity of the series of rolls 17, being located somewhat nearer to the entrance end or nip between the belts 10 than to the exit end of the machine. Heating shoes 18 are adjustable as to position, being slidably mounted on bars 20, and being kept in proper sliding contact with belts 10 by means of adjusting screws 21 and springs 22. Heating shoes 18 are drilled longitudinally near their working face 23, to provide sockets 24 for the insertion of electric cartridge heaters, not shown. They are also provided with thermocouple wells 28, so that the temperature may be determined at any time. The face 23 of shoe 18 is machined to provide an elongated diamond-shaped plane contact with tapes 10, as shown in Fig. 3. This provides a maximum heating period for film adjacent the center of the tapes and a minimum heating period for film adjacent their edges. It provides as well for a temperature differential from a fusion point at the center to a lower temperature along the edges. Cooling shoes 19 have plain faces, not shown, and withdraw heat from tapes 10, which heat is carried away by cooling liquid circulated through tubes 24a, or, alternatively, by heat dissipating metal fins, not shown. Cooling shoes 19 are adjustable, through screw 25, in a manner similar to that used on heating shoes 18. In their separate return paths between the discharge end and the entrance end of the machine, tapes 10 pass wipers 26, which keep the tapes clean, and may be used to apply a thin layer of oil to the tapes to prevent sticking to the heated plastic film.

Figure 1:
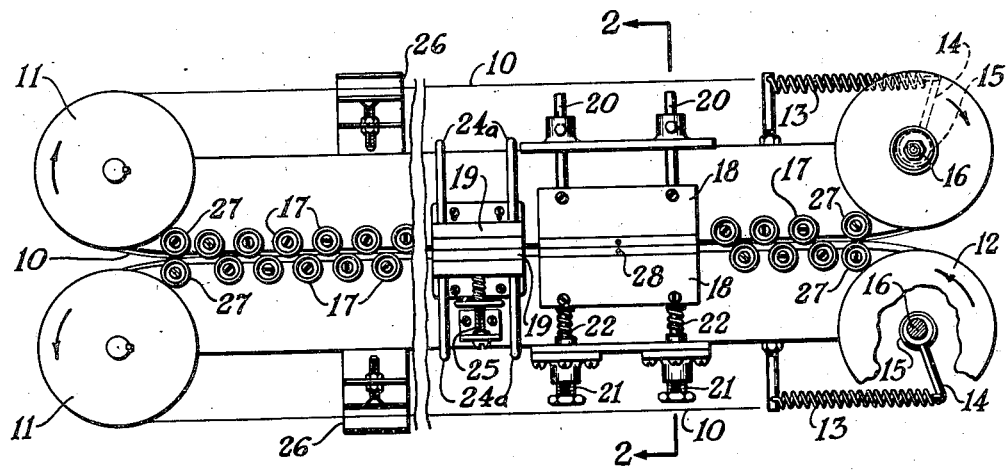
Fig. 1 is a bottom plan view of an apparatus for carrying out the method of the invention.
Figure 2:
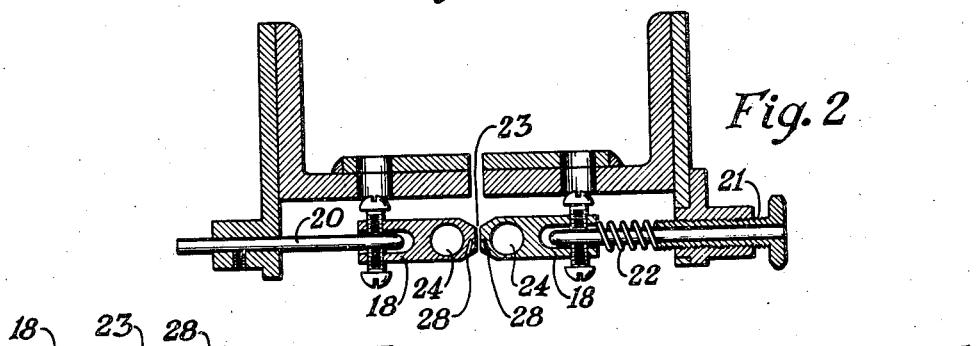
Fig. 2 is a section taken along line 2—2 of Fig. 1.

The embodiment of the invention shown in Fig. 1 is illustrated as though it were operated with wheels 11 and 12 in a horizontal plane and with tapes 10, and the films being welded, in a vertical plane, and is thus adapted to such operations as require a seal across the top of a package. It is also adapted to operation with the tapes 10 (and the films being welded) travelling in a horizontal plane. The sealing mechanism may be mounted above a work table along which the work passes while being sealed, or one of the pair of endless tapes may be in the plane of a work table while the other is on a movable head capable of being lowered into co-operation with the first tape, or of being raised out of engagement therewith. Numerous other arrangements will occur to the user, to fit the circumstances of his particular case.

In operation, two or more layers of superposed films are fed into the nip between tapes 10, which are driven at equal rates, by means not shown, through wheels 11. Heat is supplied to shoes 18, suitably by electric cartridge heaters in sockets 24, the temperature of which may be controlled, suitably by electronically regulated variation of the current supplied. Commercial instruments are available for this purpose. Tapes 10 are heated by contact with heating shoes 18 and transmit the heat to the confined film being conveyed through the machine. Owing to the shape of face 23 of shoes 18, the edges of tapes 10 are heated to slightly less than a perfect welding temperature, and for only a very brief time, and the corresponding edges of the confined portion of film are accordingly less perfectly sealed than the central portion, which is heated for a relatively longer period at a fusion temperature. As the operation continues, the confined films are carried past cooling station 19 where the tape is cooled quickly to a temperature at which the confined films are non-tacky, as may be determined by their ready release from the metal tapes. The film is cooled by the confining tapes, while being conveyed to the discharge point, and when released at that point by the diverging tapes, is found to be sealed so that the edges of the broad weld are sufficiently yieldable to localized stresses to peel back and expose a straight line of thoroughly welded stock against which such stresses are dissipated.

The working face 23 of heating shoe 18 has been illustrated and described as of elongated diamond shape. This is a preferred embodiment, but other and equivalent shapes may be employed, so long as at least one edge of the weld is heated to a slightly lower temperature, and for a relatively much shorter period than is the body of the weld. This result may be obtained through the use of a working face of elongated isosceles triangular shape (Fig. 3b), or of elongated "tear drop" shape (Fig. 3c), or of an asymmetric, i. e. fore-shortened, diamond shape (Fig. 3a), so long as the longitudinal axis of the particular working face is centrally and longitudinally disposed with respect to the heating shoe, or the working face 23 may be of the longitudinal half-diamond shape of Fig. 3d, the use of which will provide a weld with only one yieldable edge. The working face 23 of heating shoe 18 may be disposed, with respect to the direction of travel of the endless tapes 10 and the film being welded, so that the pointed tip is at either the leading or the trailing end of the heating element.

The herein described method and apparatus may be used with any organic thermoplastic film, including, for example, Koroseal (rubber hydrochloride), Vinylite (vinyl chloride-acetate), Saran (vinylidene chloride copolymer), cellulose acetate film, and the like. It may also be used to weld together the thermoplastic surfaces of plastic coated metal foil or paper, and is operable in connection with other heat-sealing sheets, such as waxed papers, though these do not present the same problem as do the oriented plastic films.

The actual temperature of the heating shoes, and the heat transmitted therethrough, may be varied at will to meet the requirements of the particular film being welded. Thus, if heat is supplied by means of an electric cartridge heater, the temperature may be regulated by means of a variable resistance inserted in the electric circuit, in the usual manner, though electronic control is far more precise, and is to be recommended. In like manner, if heat is supplied by means of steam, the temperature may be regulated through control of the steam pressure.

In a specific example, steel tapes .005 inch thick and .375 inch wide were driven at a rate of 20 feet per minute, and were heated, by means of a diamond shaped shoe 6 inches long, to a temperature of 148–150° C., as shown by readings from a thermocouple inserted in well 28. Tension was maintained on the tapes by means of screws 21 and springs 22, so that, in operation, slippage of film was prevented. Two edges of a film .002 inch thick, composed of a plasticized copolymer of 85 per cent vinylidene chloride and 15 per cent vinyl chloride, having a fusion point of 145° C., were fed between the tapes and passed through the machine at the stated rate of travel of the tapes. After passing the heating shoes 18, the tapes and confined films were cooled to about 50° C. by means of cooling shoes 19, through which water was circulated at a feed temperature of 20° C., and at such a rate that effluent water was not over 50° C. On emerging from the machine, the two film edges were found to be joined in a weld which was thoroughly sealed at its center and was sufficiently yieldable along its edges to assure distribution of locally applied stresses along a straight line normal to the applied force.

In the herein-described apparatus, it is found that heating shoes having the described or equivalent shaped working faces readily overcome the effect of any casual imperfection or irregularity in the tapes 10 or in the film being welded. Thus, due to the length of the shoe, irregularities which would tend to release the sliding contact between face 23 and tape 10 can do so only briefly, and contact is resumed and fusion effected before such irregularity moves out of the heating zone. Similarly, it is found that small variations in temperature of the heating shoe (within the welding range) result in corresponding slight changes in the width of the thoroughly fused main body of the weld, rather than in any essential weakening of the weld. It is appreciated, of course, that irregularities in the tapes, the film, or the welding temperature are all to be avoided if possible, but it has been found that the present apparatus performs successfully in the face of such difficulties when they must be encountered.

Reference has been made herein to a welding temperature in the tapes opposite the main body of the weld and a "slightly lower" temperature near at least one edge thereof. The latter term may be defined in numerical terms only approximately, but in general is intended to designate a temperature of from 1 to 10 centigrade degrees, and usualy of from 3 to 5 degrees below the fusion temperature. When using the described shape of heating shoe, and when maintaining the required fusion temperature opposite the main body of the weld, it is a natural consequence that a slightly lower temperature will be imparted to the edge of the weld, during operation of the apparatus.

We claim:

1. A machine for welding superposed layers of thermoplastic films, comprising a pair of opposed flexible endless metal tapes adapted to travel through respective closed circuits, said tapes being disposed in face-to-face relation through a portion of their circuits to form a working zone in which the superposed films are confined between the tapes, means to drive the tapes at the same linear speed, means to maintain said tapes under sufficient tension to apply a holding pressure upon the films therebetween, fixed guide rollers in said working zone between which the pair of tapes is caused to pass in a sinuous path, heating shoes in sliding engagement with said tapes, and cooling means following said heating shoes in the direction of travel of the tapes.

2. A machine for welding superposed layers of thermoplastic films, comprising a pair of opposed flexible endless metal tapes adapted to travel through respective closed circuits, said tapes being disposed in face-to-face relation through a portion of their circuits to form a working zone in which the superposed films are confined between the tapes, means to drive the tapes at the same linear speed, means to maintain said tapes under sufficient tension to apply a holding pressure upon the films therebetween, fixed guide rollers in said working zone between which the pair of tapes is caused to pass in a sinuous path, heating shoes in sliding engagement with said tapes having an elongated contact face tapering in width from one end toward the other end, and cooling means following said heating shoes in the direction of travel of the tapes.

3. Machine according to claim 2, in which the heating shoes has a contact face tapering in width from each end to an intermediate point.

4. Machine according to claim 3, in which the heating shoes have a contact face of diamond shape.

5. A machine for welding superposed layers of thermoplastic films, comprising a pair of opposed flexible endless metal tapes adapted to travel through respective closed circuits, said tapes being disposed in face-to-face relation through a portion of their circuits to form a working zone in which the superposed films are confined between the tapes, means to drive the tapes continuously at the same linear speed, means to maintain said tapes under sufficient tension to exert a lateral holding pressure in the working zone upon the films therebetween, an opposed pair of heating shoes in the working zone between which the tapes pass in sliding engagement, and a pair of cooling shoes in sliding engagement with the tapes following said heating shoes in the direction of travel of the tapes.

6. Machine according to claim 5, in which the heating shoes and cooling shoes are provided with means for adjusting and regulating the pressure of the shoes upon the tapes in sliding engagement therewith.

ROBERT D. LOWRY.
WILLIAM ROLAND CHURCH.

(References on following page)

REFERENCES CITED

The following references are of record in the file of this patent:

UNITED STATES PATENTS

| Number | Name | Date |
|---|---|---|
| 1,361,970 | Dickey | Dec. 14, 1920 |
| 2,097,427 | Bergstein | Nov. 2, 1937 |
| 2,107,249 | Hepke | Feb. 1, 1938 |
| 2,127,183 | Moore | Aug. 16, 1938 |
| 2,157,732 | Piazze | May 9, 1939 |
| 2,248,038 | Adams | July 8, 1941 |
| 2,253,036 | Kimple | Aug. 19, 1941 |
| 2,392,695 | Rohdin | Jan. 8, 1946 |
| 2,410,834 | Messmer | Nov. 12, 1946 |
| 2,451,728 | Gardner | Oct. 19, 1948 |